US011921918B2

(12) United States Patent
Hayashi et al.

(10) Patent No.: US 11,921,918 B2
(45) Date of Patent: Mar. 5, 2024

(54) HEADS UP DISPLAY IN VIRTUAL REALITY

(71) Applicant: Sony Interactive Entertainment LLC, San Mateo, CA (US)

(72) Inventors: Eric M. Hayashi, Woodside, CA (US); Christopher Philip Nicholls, Thousand Oaks, CA (US); Heston Barber, Westlake Village, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 17/528,067

(22) Filed: Nov. 16, 2021

(65) Prior Publication Data
US 2023/0152885 A1     May 18, 2023

(51) Int. Cl.
| | | |
|---|---|---|
| *A63F 13/533* | (2014.01) | |
| *A63F 13/5372* | (2014.01) | |
| *A63F 13/5375* | (2014.01) | |
| *A63F 13/847* | (2014.01) | |
| *A63F 13/87* | (2014.01) | |
| *G06F 3/01* | (2006.01) | |
| *G06T 15/00* | (2011.01) | |
| *G06V 20/20* | (2022.01) | |
| *G10L 15/26* | (2006.01) | |

(52) U.S. Cl.
CPC ............ *G06F 3/013* (2013.01); *A63F 13/533* (2014.09); *A63F 13/5372* (2014.09); *A63F 13/5375* (2014.09); *A63F 13/847* (2014.09); *A63F 13/87* (2014.09); *G06T 15/00* (2013.01); *G06V 20/20* (2022.01); *G10L 15/26* (2013.01); *A63F 2300/305* (2013.01); *A63F 2300/306* (2013.01); *A63F 2300/308* (2013.01); *A63F 2300/572* (2013.01)

(58) Field of Classification Search
CPC .... G06F 3/013; A63F 13/533; A63F 13/5372; A63F 13/5375; A63F 13/847; A63F 13/87; A63F 2300/305; A63F 2300/306; A63F 2300/308; A63F 2300/572; G06V 20/20; G06T 15/00; G10L 15/26
USPC .......................................................... 463/31
See application file for complete search history.

(56) References Cited

U.S. PATENT DOCUMENTS 10,037,626 B2 *   7/2018   Poulos .................... G06F 1/163
10,290,152 B2 *   5/2019   Schwarz ............. G06F 3/04815
10,845,595 B1 *  11/2020   Sohn .................. G02B 27/0093
(Continued)

OTHER PUBLICATIONS

Intl Preliminary Report & Written Opinion PCT/US2022/048885, dated Feb. 13, 2023, total 17 pages.
(Continued)

*Primary Examiner* — Allen Chan
(74) *Attorney, Agent, or Firm* — PENILLA IP, APC

(57) ABSTRACT

A method including rendering a view of a virtual environment of a video game for display in a head mounted display of a user, wherein the virtual environment includes a plurality of objects. The method including tracking gaze of the user. The method including detecting that the gaze of the user is directed towards an object in the view for a period of time. The method including generating a heads up display (HUD) interface including information related to the object. The method including surfacing the HUD interface near the object in the view of the virtual environment.

22 Claims, 6 Drawing Sheets

(56) References Cited

U.S. PATENT DOCUMENTS

| | | | |
|---|---|---|---|
| 2015/0038233 A1* | 2/2015 | Rom | A63F 13/42 463/42 |
| 2017/0038837 A1 | 2/2017 | Faaborg et al. | |
| 2020/0301504 A1* | 9/2020 | Williams | G06T 11/60 |
| 2021/0174589 A1 | 6/2021 | Emery et al. | |

OTHER PUBLICATIONS

Toet et al: "Gaze directed displays as an enabling technology for attention aware systems", Computers in Human Behavior, Pergamon, New York, NY, US, vol. 22, No. 4, Jul. 1, 2006 (Jul. 1, 2006), ISSN: 0747-5632, DOI: 10.1016/J. CHB.2005.12.010 [retrieved on Jul. 1, 2006] p. 625-p. 627.

* cited by examiner

HEADS UP DISPLAY IN VIRTUAL REALITY

TECHNICAL FIELD

The present disclosure is related to computing gaming, and more specifically to providing information of an object in a heads up display within a virtual environment.

BACKGROUND OF THE DISCLOSURE

Video gaming provides gameplay within a virtualized gaming world. These video games may be formatted in single-player mode or multi-player mode. For example, video games may provide gaming from various perspectives or points-of-view, including a first-person perspective or third person perspective, etc. In the first-person perspective, the player is viewing the virtual gaming environment from the eyes of a character in a three dimensional virtual space. In the third-person perspective, the player controls a character as if a third person is viewing the character, such as from an over-the-shoulder or behind-the-back of the character perspectives. A popular genre of gaming from a first-person and/or third-person perspective includes shooter games that involve combat situations using much desired weaponry (e.g., large and effective guns with unlimited rounds) that follow a story line or course of action.

In some configurations, information related to a video game may be presented on a display having a small form factor placed on a part of a body of a controlled character, such as display worn on the wrist, arm, or leg, or may be held in the hand of the character. In that manner, the user may manipulate the character within the virtual environment to gain a view of the display. For example, for a display worn on the wrist of the character, much like a wristwatch, the user may lift the arm and/or wrist and/or may tilt the head of the character in such a manner (e.g., downwards) so that the display is viewable. Information on the display may pertain to any aspect of the game play.

However, viewing the information on the display held or worn by the character may introduce some issues for the user playing the game. For example when viewing and digesting information presented on a display, the user's attention is fully focused on the display and not on the game play. That is, the situation presented in the game play (e.g., battling the boss) does not stop just because the character's viewpoint is pointed to the display. As such, the user may choose to forego viewing any information on the display in order to focus on the game play (e.g., continuing battling the boss) even though the information may be helpful (e.g., game tips for battling the boss). That is, there may not be enough time presented during the game play to the user to view the display. Further, there may be too much information that is presented on the display. That is, there may be so much information that the user is unable to gain anything useful from that information, or may have to take an extended period of time to digest the information. That delay in viewing and digesting the information may be adversely propagated to any downstream actions and/or reactions of the user when playing the video game.

It is in this context that embodiments of the disclosure arise.

SUMMARY

Embodiments of the present disclosure relate to computer gaming, and more specifically to providing information of an object in a heads up display (HUD) within a virtual environment as viewed through a head mounted display (HMD).

In one embodiment, a method is disclosed. The method including rendering a view of a virtual environment of a video game for display in a head mounted display of a user, wherein the virtual environment includes a plurality of objects. The method including tracking gaze of the user. The method including detecting that the gaze of the user is directed towards an object in the view for a period of time. The method including generating a heads up display (HUD) interface including information related to the object. The method including surfacing the HUD interface near the object in the view of the virtual environment.

In another embodiment, a non-transitory computer-readable medium storing a computer program for gaming is disclosed. The computer-readable medium including program instructions for rendering a view of a virtual environment of a video game for display in a head mounted display of a user, wherein the virtual environment includes a plurality of objects. program instructions for tracking gaze of the user. The computer-readable medium including program instructions for detecting that the gaze of the user is directed towards an object in the view for a period of time. The computer-readable medium including program instructions for generating a heads up display (HUD) interface including information related to the object. The computer-readable medium including program instructions for surfacing the HUD interface near the object in the view of the virtual environment.

In another embodiment, a computing system includes a processor and memory coupled to the processor and having stored therein instructions that, if executed by the computer system, cause the computer system to execute a method. The method including rendering a view of a virtual environment of a video game for display in a head mounted display of a user, wherein the virtual environment includes a plurality of objects. The method including tracking gaze of the user. The method including detecting that the gaze of the user is directed towards an object in the view for a period of time. The method including generating a heads up display (HUD) interface including information related to the object. The method including surfacing the HUD interface near the object in the view of the virtual environment.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1:
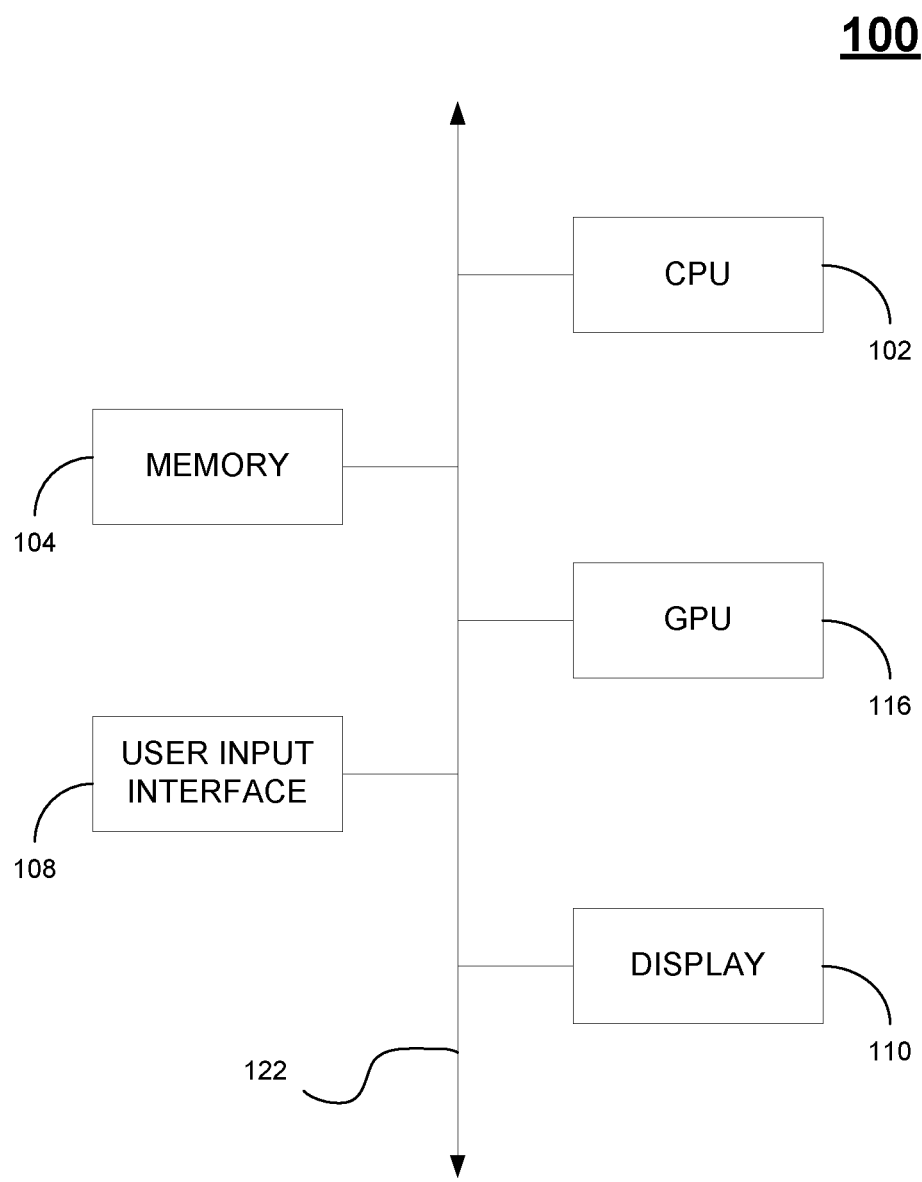
FIG. 1 illustrates components of an example device that can be used to perform aspects of the various embodiments of the present disclosure.

Reference will now be made in detail to the various embodiments of the present disclosure, examples of which are illustrated in the accompanying drawings. Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe a method for providing information of an object in a heads up display (HUD) within a virtual environment as viewed through a head mounted display (HMD), and providing the information within a HUD within a scope mode view of the virtual environment that magnifies a targeted object.

With the above general understanding of the various embodiments, example details of the embodiments will now be described with reference to the various drawings.

Throughout the specification, the reference to "game" or "video game" or "gaming application" is meant to represent any type of interactive application that is directed through execution of input commands. For illustration purposes only, an interactive application includes applications for gaming, word processing, video processing, video game processing, etc. Further, the terms introduced above are interchangeable.

It should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "rendering," "tracking," "detecting," "generating," "surfacing," "removing," "identifying," "performing," or the like, refer to actions and processes (e.g., flow diagram 200 of FIG. 2) of a computer system or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

The disclosure can also be embodied as computer readable code on a computer readable medium, such as program modules, executed by one or more computers or other devices. Further, communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 illustrates components of an example device 100 that can be used to perform aspects of the various embodiments of the present disclosure. For example, FIG. 1 illustrates an exemplary hardware system suitable for executing a video game configured to provide and/or present information of an object in a heads up display (HUD) within a virtual environment and/or virtual reality (as generated through execution of an application) as viewed through a head mounted display (HMD), in accordance with one embodiment of the present disclosure. This block diagram illustrates a device 100 that broadly represents any single or multi-processor computing device or system capable of executing computer-readable instructions. Examples of device 100 can incorporate or can be, without limitation, a personal computer, workstations, a server computer, gaming console, client side terminals, laptops, mobile device, distributed computing systems, or other digital device, each of which is suitable for practicing an embodiment of the disclosure.

Both the central processing unit (CPU) 102 and the graphics processing unit (GPU) 116 are coupled to memory 104. Generally, CPU 102 and/or GPU 116 may represent any type or form of processor and/or computing device capable of processing data or interpreting and executing instructions. In certain embodiments, CPU 102 and/or GPU 116 may receive instructions from a software application or hardware module. These instructions may cause CPU 102 and/or GPU 116 to perform the functions of one or more of the example embodiments described and/or illustrated herein. CPU 102 and/or GPU 116 may also perform and/or be a means for performing any other steps, methods, or processes described and/or illustrated herein.

In particular, CPU 102 is configured for running software applications and optionally an operating system. CPU 102 may be comprised of one or more homogeneous or heterogeneous processing cores. In accordance with various embodiments, CPU 702 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for graphics processing during execution of a game.

For example, CPU 102 provides the GPU 116 with data and/or instructions defining the desired output images, from which the GPU 116 generates the pixel data of one or more output images. The data and/or instructions defining the desired output images can be stored in memory 104 and/or dedicated graphics memory (not shown). In an embodiment, the GPU 116 includes 3D rendering capabilities for generating pixel data for output images from instructions and data defining the geometry, lighting, shading, texturing, motion, and/or camera parameters for a scene. The GPU 116 can further include one or more programmable execution units capable of executing shader programs.

Memory 104 stores applications and data for use by the CPU 102 and GPU 116. Memory 104 generally represents any type or form of volatile or non-volatile storage device or medium capable of storing data and/or other computer-readable instructions for applications, and may include, without limitation, fixed disk drives, removable disk drives, flash memory devices, RAM, ROM, and CD-ROM, DVD-ROM, Blu-ray, HD-DVD, or other optical storage devices, as well as signal transmission and storage media. In the example of FIG. 1, memory 104 is a shared memory, whereby the memory stores instructions and data for both the CPU 102 and the GPU 116. Alternatively, there may be separate memories dedicated to the CPU 102 and the GPU 116, respectively.

The GPU 116 periodically outputs pixel data for an image from a memory (e.g., graphics memory, frame buffer, etc.) to be displayed on display device 110. Display device 110 can be any device capable of displaying visual information in response to a signal from the device 100, including CRT, LCD, plasma, and OLED displays. Device 100 can provide the display device 110 with an analog or digital signal, for example. In one embodiment, display device 110 includes an HMD (e.g., displaying virtual reality or VR content).

User input devices 108 communicate user inputs from one or more users to device 100, examples of which may include keyboards, mice, joysticks, touch pads, touch screens, still or video recorders/cameras, and/or microphones. Also, a network interface (not shown) may provide for communications with other systems (e.g., communications between a game console, HMD, controllers, etc.) via an electronic communications network, and may include wired or wireless communication over local area networks and wide area networks such as the internet. The components of device 100, including CPU 102, GPU 116, memory 104, user input devices 108, network interface, etc. are connected via one or more data buses 122.

In some embodiments, a computer-readable medium containing a computer program may be loaded into computing system 100. All or a portion of the computer program stored on the computer-readable medium may then be stored in system memory 104 and/or various portions of storage devices. When executed by processors (e.g., CPU 102 and/or GPU 116), a computer program loaded into computing system 100 may cause CPU 102 and/or GPU 116 to perform and/or be a means for performing the functions of the example embodiments described and/or illustrated herein. Additionally or alternatively, the example embodiments described and/or illustrated herein may be implemented in firmware and/or hardware.

In one embodiment, the CPU 102 and/or GPU 116 are configured to provide emulation of a computing platform (e.g., operating system) that is configured to execute a software application. The emulation of the computing platform may be implemented in software, hardware, or a combination of the two. In that manner, the CPU 102 and/or GPU 116 may be configured to execute any type of application, whether the application is a legacy application or an application designed for computing platforms of the future.

Figure 2:
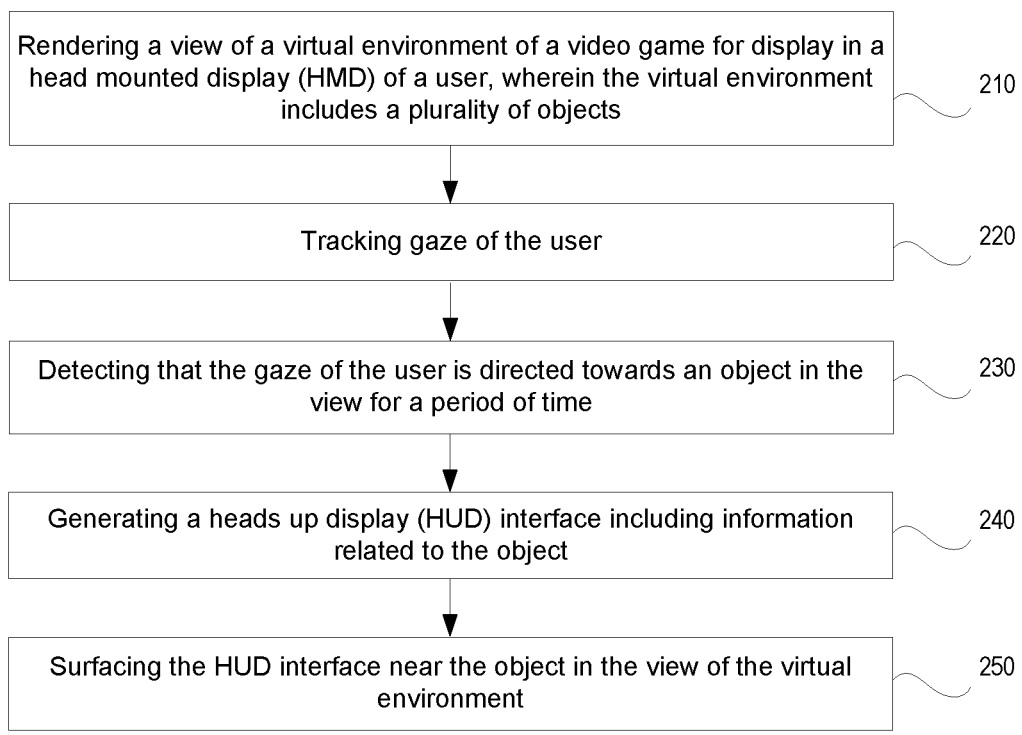
FIG. 2 is a flow diagram illustrating a method for presenting information in a heads up display in virtual reality, in accordance with one embodiment of the present disclosure.

FIG. 2 is a flow diagram 200 illustrating a method for presenting information in a heads up display in virtual reality, in accordance with one embodiment of the present disclosure. In particular, flow diagram 200 increases the abilities of a user and/or player playing a video game by providing information about the video game within the game play of the player. In that manner, the user is provided with additional information related to the video game that is not normally provided during game play. That additional information may make the game play more enjoyable as the user is able to make more informed decisions within the game play.

At 210, the method includes rendering a view of a virtual environment and/or virtual reality during execution of a video game for display in a head mounted display (HMD) of the user. For example, video frames are generated for a three dimensional field-of-view (FOV) into the virtual environment depending on the input controls and other control signals of the user. In addition, the virtual environment includes a plurality of objects provided within a scene, wherein the scene may be shown in the HMD in a series of image frames.

At 220, the method includes tracking gaze of the user. In particular, the direction of the gaze of the user with respect to the HMD and correspondingly with respect to a scene of the virtual environment shown in the HMD is determined. Gaze tracking may be performed using any of a number of techniques. For illustration purposes only, gaze tracking may be performed within the HMD using one or more gaze tracking cameras configured to capture images of the user's eyes, which are analyzed to determine the gaze direction of the user. Gaze direction of the user can be defined relative to the HMD, relative to a physical environment of the user (e.g., by tracking location and orientation of the HMD within the physical environment the ability to perform gaze tracking allows the gaze direction to be made with reference to the physical environment, such as in a real-world gaze), and/or relative to a virtual environment rendered and/or shown in the HMD.

At 230, the method includes detecting that the gaze of the user is directed towards an object in the view for a period of time. In particular, the direction of the gaze of the user relative to the virtual environment is detected. Also, the direction into the scene is used to determine that the gaze is directed to one or more objects in the scene that are located in the vicinity of the direction of the gaze. For example, the direction of the gaze into the scene may indicate that the attention of the user is directed towards an object in the scene that is aligned, closely aligned, or loosely aligned with the direction of the gaze. As an illustration the gaze direction may indicate a sight line that is drawn into the scene, wherein the object intersects with the sight line, or can be inferred to intersect with the sight line (i.e., is near to or within a range of the sight line).

Further, gaze tracking may indicate that the direction of the gaze is fixated on the object for a period of time. That is, the direction of the gaze is consistently directed (e.g., same or general direction) towards an area of the scene in the virtual environment for the period of time, wherein the area of the scene includes the object. In that manner, it may be determined that the gaze of the user is fixated on the object for that period of time. The period of time is sufficient to indicate that the attention of the user is probably focused on the object and that the user is interested in that object.

At 240, the method includes generating a heads up display (HUD) interface including information related to the object. That is, once it is determined that the gaze of the user is directed towards the object, which indicates that the user is interested in that object, information about that object may be presented to the user. In one embodiment, the information is presented in a HUD interface that is populated into the scene of the virtual environment. For example, the HUD interface may be configured as any interface (e.g., display, window, etc.) that may be placed into the scene in order to display information that is presented within the interface. In addition, the information may be of one of many formats understandable by the user, such as text, symbols, icons, graphs, bars, status bars, video, audio, etc., and the information may be used to serve one of many purposes, such as providing background information about the object, providing helpful information related to the object, etc.

At 250, the method includes surfacing the HUD interface near the object in the view of the virtual environment. In particular, the HUD interface including the information related to the object is placed into the scene at a location that is near and/or adjacent to the object. In that manner, the HUD interface and the information contained therein can be readily associated with that particular object to the user.

Further, the HUD interface may be static for a period of time such that the HUD interface and the information contained therein remains unchanged. In another implementation, the HUD interface and the information contained therein may be continually updated during that period of time. In still other implementations, the HUD interface is movable through the scene. For example, when the object moves, the HUD interface may follow the movements of the object, such that that HUD interface remains near and/or adjacent to the object.

Figure 3A:
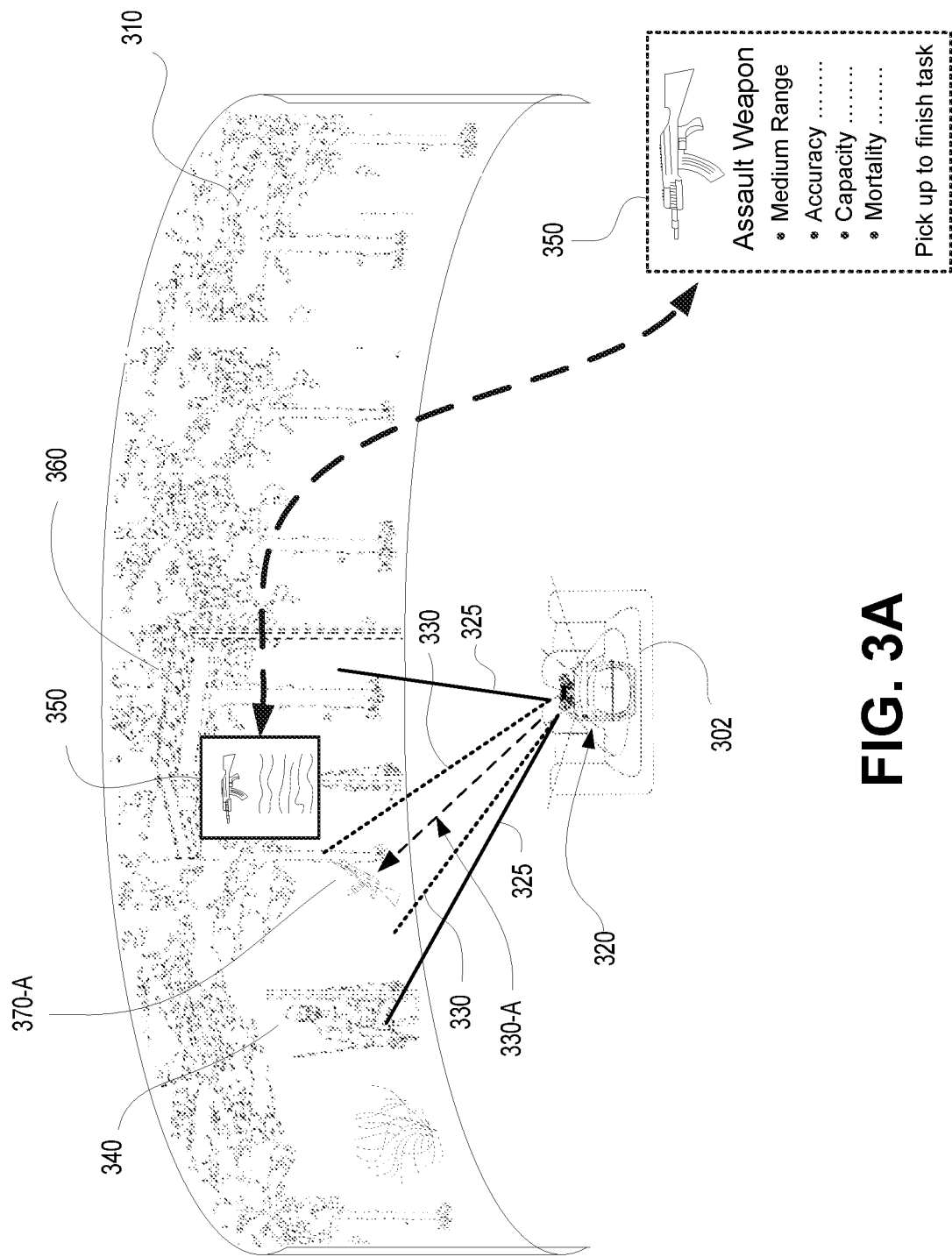
FIG. 3A illustrates a user viewing a scene in virtual reality including a heads up display providing information about an object in the scene, in accordance with an embodiment of the invention.

FIG. 3A illustrates a user viewing a scene 310 in virtual reality including a heads up display (HUD) interface 350 providing information about an object in the scene, in accordance with an embodiment of the invention. Purely for illustration purposes only, the user 302 is seated and wearing the head mounted display (HMD) 320 while playing a video game. In that manner, the scene is presented within the HMD 320, such that that user 302 is able to view a 3D presentation of the scene 310. While embodiments of the disclosure may be described in relation to a user playing a video game or gaming application, it is understood that the user may be interacting with any type of application, including a video game, service related application, work related application (e.g., word processing, spreadsheet, design application, computer-aided design (CAD) application, etc.).

Purely for illustration, the scene 310 may be presented during the game play of the user 320, wherein the scene may include a plurality of objects (e.g., characters, backdrop, environment, etc. For example, the scene 310 may be a jungle scene, including a makeshift camp in a forest of trees, wherein the video game may be a first person shooter game. The camp may include some form of protection 360, such as an awning that includes one or more posts. A character 340 is also presented within the scene 310.

As shown, a field-of-view (FOV) of the scene is presented to the user 302 within the HMD 320, wherein the FOV is defined between lines 325. The user 302 generally dictates what FOV is presented through orientation of the HMD 320 and/or the direction of the gaze of the user. As shown, the FOV is a portion of the scene 310 and includes the protection 360, object 370-A, character 340, and various other background objects (e.g., trees, etc.).

As shown, a gaze of the user is defined within the FOV. That is, gaze tracking may be used to determine in what direction is the user's gaze. Gaze direction may indicate a direction of the attention of the user and correspondingly an area of the scene 310 that is the focus of the user's attention. The gaze of user 302 is defined between lines 330. A particular direction of the gaze may be defined by line 330-A as determined through gaze tracking. Object 370-A may intersect with line 370-A, and indicates that the gaze of the user 302 is directed towards that object 370-A.

A HUD interface 350 is presented within the scene 310, wherein the HUD interface includes information related to the object 370-A. For example, once it is determined that the user's attention is directed towards the object, information may be presented to the user 302 through a HUD interface 350. For example, the HUD interface may be configured as any interface (e.g., display, window, etc.) that may be placed into the scene in order to display information that is presented within the interface. For purposes of illustration, the HUD interface may be a two-dimensional (2D) or three-dimensional (3D) panel configured to include the information. In one embodiment, the HUD interface 350 is presented within the scene as an overlay. In another embodiment, the HUD interface 350 is embedded within the virtual environment and/or scene 310, such that the HUD interface 350 is integrated into the virtual environment through the execution of the video game, for example, having the HUD interface 350 as another object 350 in the scene 310.

As such, the HUD interface 350 is presented to the user within a display of the HMD 320. The HUD interface 350 may be configured as any interface (e.g., display, window, etc.) that may be placed into the scene in order to display information that is presented within the interface. For purposes of illustration, a blow-up of the HUD interface 350 is shown in FIG. 3A in order to view the information 351 presented within the HUD interface, wherein the information 351 may be of one of many formats understandable by the user, such as text, symbols, icons, graphs, bars, status bars, video, audio, etc.

In embodiments, the information 351 that is presented in the HUD interface 350 may serve one or more purposes. For example, the information 351 may be intended to be useful to the user, such as helping to advance the game play of the user (e.g., providing tips in the game play that may be triggered by or related to the object). Also, the information 351 may include a tip that the user needs to pick up that object in order to advance through the game play. In a practical form of being helpful, the information 351 may give the user a sense of what the object is and why that object is in the scene. In other implementations, the information 351 may be intended to help create user awareness of the video game and/or the game play of the video game. That is, information 351 may be peripherally related to the object 370-A, such as setting up the scene 310, or providing background information to the scene, etc. For example, the information may 351 help convey a certain picture of the scene in the virtual environment, or help create a certain vibe or emotion of the game play (e.g., suspense, happiness, sadness, etc.). In other implementations, the information 351 may be used to give the user background information about the object.

For illustration purposes only, the information 351 may provide background information about the object, providing helpful information related to the object, etc. For example, the information 351 may be related to object 370-A, such as identifying the object as an assault weapon, and providing one or more characteristics of the assault weapon (e.g., medium range capability, accuracy of the weapon, capacity of the weapon, effectiveness of the weapon rated on a mortality scale, etc. In addition, the information 351 may include a note related to the object 370-A. As previously described, in one implementation, the note may be a tip useful in advancing the game play of the user. For instance, the note may indicate that ownership of the object 370-A may be helpful in completing a current or future task in the game play of the user 302.

In one embodiment, the HUD interface 350 is opaque and/or having one or more degrees of transparency such that the virtual environment including scene 310 is visible through the HUD interface 350. In that manner, the information 351 in HUD interface 350 may be presented to the user without interfering with the user's game play. For instance, the user 302 may be engaged in an intense period of game play (e.g., battling the boss), wherein the information may be helpful to the user (e.g., tips on beating the boss), but taking too much attention of the user away from the scene 310 may cause harm to the user (e.g., losing to the boss while accessing the information 351 from the HUD interface 350)

In one embodiment, the HUD interface 350 is zoomed in within the display of the HMD 320 while the gaze of the user 302 is directed towards the object 370-A. That is, a zooming in towards the HUD interface 350 is performed within the FOV presented in the HMD, such that the HUD interface 350 gradually becomes larger within the FOV while the gaze of the user is continually directed towards the object. The zooming in towards the HUD interface 350 and the zooming out from the HUD interface may be performed as a function of the gaze of the user. For instance, as it is detected that the gaze of the user 302 is directed away from the object 370-A, a zooming out away from the HUD interface 350 is performed within the FOV, such that the HUD interface gradually becomes smaller within the FOV of the user. Similarly, a zooming in towards the HUD interface 350 is performed within the FOV as it is detected that the gaze of the user 302 is directed towards the object 370-A, such that the HUD interface gradually becomes larger within the FOV of the user, up to a particular size of the HUD interface.

In one embodiment, the HUD interface 350 is terminated and/or removed from being displayed in the HMD 320 upon detecting that the gaze of the user is directed away from the object 370-A for a period of time. The period of time is selectable to indicate that the attention of the user 302 is no longer focused on the object 370-A. In particular, gaze tracking may be implemented to detect that the gaze is directed away from the object, and in what manner. For example, the gaze is tracked and analyzed to determine a gaze history function of the gaze, wherein the gaze history function measures attention of the user in relation to the object. The gaze history function may include linear and/or non-linear sections with respect to time. In addition, the HUD interface 350 may be terminated and/or removed when the gaze history function satisfies a time decay function, wherein the time decay function measures decaying attention of a generic user in relation to a generic object, and can be used to determine when attention of that generic user is no longer directed towards the generic object—i.e., the generic user is no longer interested in the generic object. The time decay function may include linear and non-linear sections with respect to time, and may indicate degrees of attention of the user. Matching particular sections of the gaze history function and the time decay function may indicate that the attention of the user 302 is no longer directed towards object 370-A, and/or that the user is no longer interested in that object. In one embodiment, the transparency of the HUD interface 350 is increased (e.g., increasing degrees of transparency) during a transition period before fully removing the HUD interface 351 as displayed within the HMD 320 as long as the gaze history function satisfies the time decay function (e.g., fading out the HUD interface 350). In another embodiment, the transparency of the HUD interface 350 is decreased as displayed within the HMD 320 when the gaze history function does not follow the time decay function, indicating that while the attention of the user may have strayed from the object 370-A, the user has again focused attention back on the object (e.g., fading back in of the HUD interface 350).

Figure 3B:
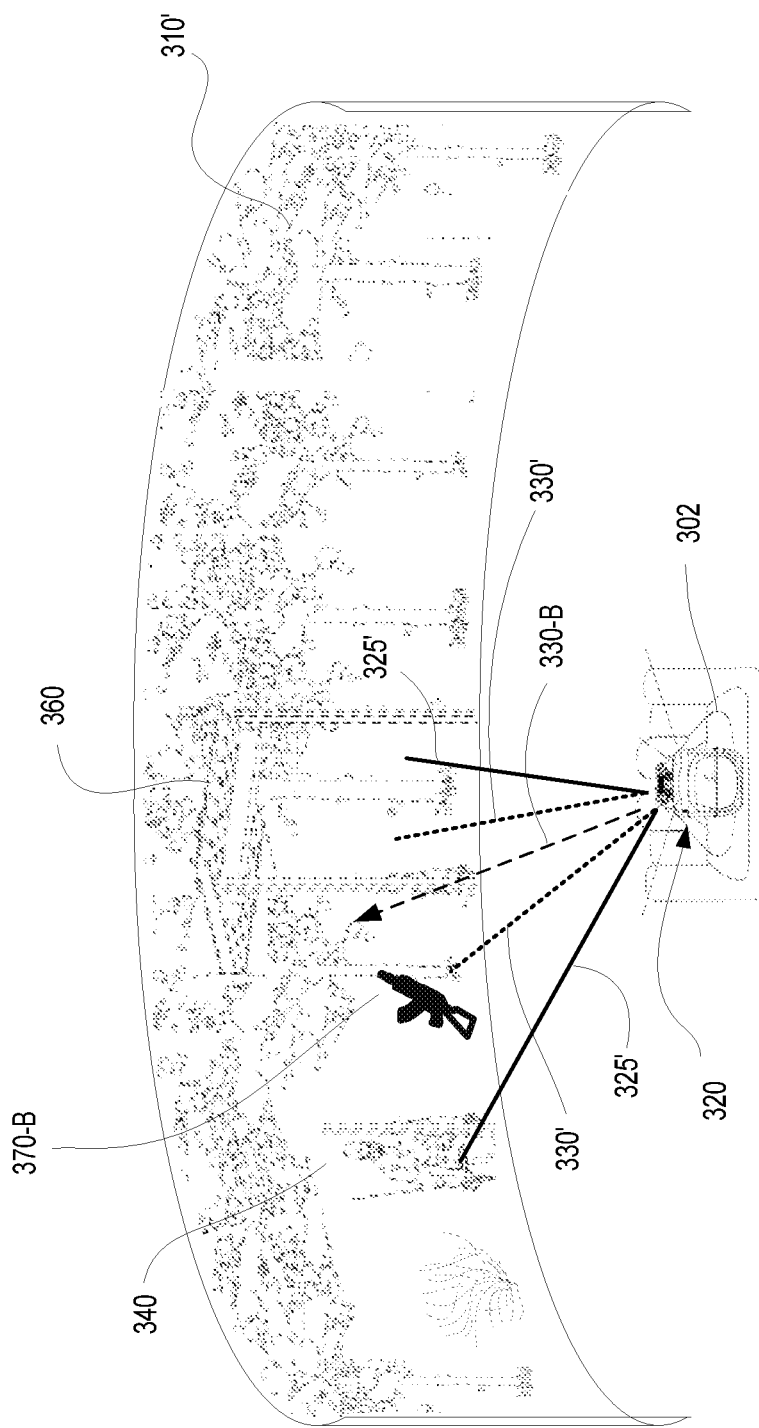
FIG. 3B illustrates an object being highlighted for a user viewing a scene in virtual reality, in accordance with one embodiment of the present disclosure.

FIG. 3B illustrates an object being highlighted for a user viewing a scene in virtual reality, in accordance with one embodiment of the present disclosure. For example, the user may be playing the video game introduced in FIG. 3A, and is viewing scene 310' at a different time during the game play. As shown, the FOV of the scene 310' is presented to the user 302 within the HMD 320, wherein the FOV is defined between lines 325'. As shown, the FOV is a portion of the scene 310' and generally contains similar objects as in scene 310 of FIG. 3A, such as a jungle scene including a makeshift camp in a forest of trees, character 340, protection 360, highlighted object 370-B (which corresponds to object 370-A), etc.

Further, a gaze of the user 302 is defined within the FOV. Gaze direction may indicate a direction of the attention of the user and correspondingly an area of the scene 310' that is the focus of the user's attention. The gaze of user 302 is defined between lines 330'. A particular direction of the gaze may be defined by line 330-B as determined through gaze tracking. Line 370-B may intersect with protection 360, wherein the gaze of user 302 may be moving from right to left, or left to right, such as when canvassing the scene 310'.

Although the assault weapon (i.e., corresponding to object 370-A of FIG. 3A) is not in the direction of the gaze of the user 302, the assault weapon may be within an adjacent area of the gaze direction, such as within a portion of the FOV defined between lines 325'. In one embodiment, the assault weapon is then highlighted as object 370-B in an effort to bring the attention of the user to the assault weapon. Thereafter, once it is determined that the user 302 is directing gaze towards the assault weapon for a period of time an HUD interface may be populated and/or surfaced within the scene 310' including information related to the assault weapon.

In one embodiment, objects are identified within scene 310'. Further, it may be determined that one or more objects are important in the game play of the user 302. For example, it may be determined that the assault weapon is important in the game play of the user (e.g., needed to accomplish a task in the game play). Importance of the object may be determined through rules configured to determine the most relevant objects within the scene, or may be determined through artificial intelligence (AI) that takes into consideration the context of the game play, the objects within the scene shown in the FOV, etc.

In one embodiment, after the object (e.g., assault weapon) is identified and after the object is determined to be important to the game play of the user, that object is highlighted (e.g., as highlighted object 370-B) within the scene 310' of the virtual environment. Highlighting may occur when it is determined that the important object is within a range of the gaze direction of the user, even though the direction of the gaze of the user 302 may not be entirely aligned with that object. Highlighting of the object may direct the attention of the user towards the highlighted object 370-B, and may indicate that the object is important. Without highlighting, the user may not become aware of the object, and/or may take a long time to become aware of the object.

Figure 3C:
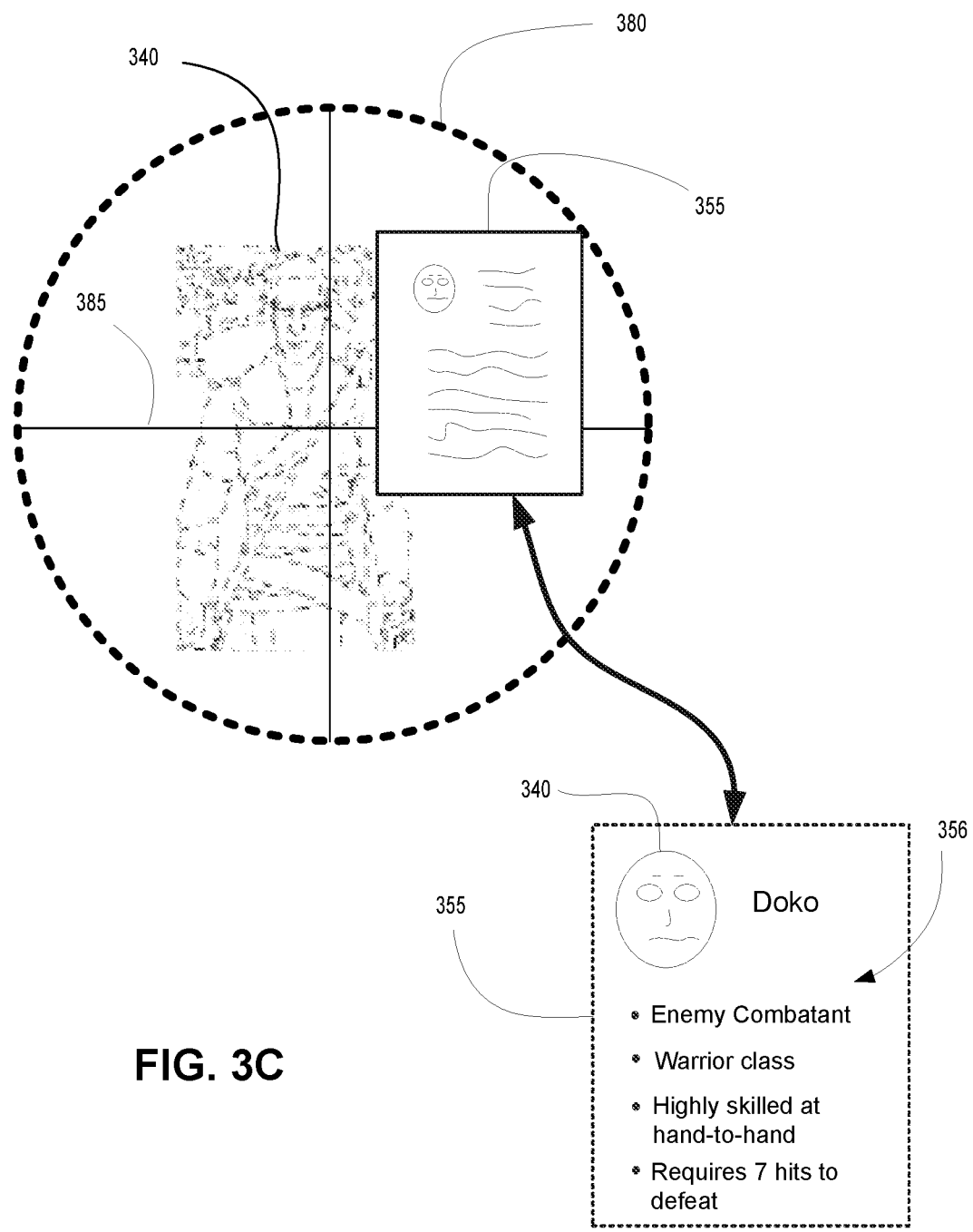
FIG. 3C illustrates a scope mode view providing a magnified view of a target object within a scene in virtual reality and the presentation of information related to the object in a heads up display, in accordance with one embodiment of the present disclosure.

In one embodiment, the object is only highlighted upon a first interaction with that object. That is, it may be determined that the object has not been previously encountered in the game play of user 302, and that the gaze of the user is directed towards the object for a first time in a game play of the user. As such, the user is probably previously unaware of the object, and highlighting may bring attention of the user to the highlighted object 370-B FIG. 3C illustrates a scope mode view 380 providing a magnified view of a target object (e.g., character 340) that is included within a scene in a virtual environment, and the presentation of information 356 related to the object in an HUD interface 355 in the scope mode view 380, in accordance with one embodiment of the present disclosure. For example, the scope mode view 380 may be presented to user 302 when viewing the scene 310 of FIG. 3A, or when viewing the scene 310' of FIG. 3B.

A magnified view of the object being targeted is rendered within the scope mode view 380 being displayed in the HMD 320. In particular, the FOV of the scene provided to user 302 in the HMD 320 may be replaced with the scope mode view 380 that includes a magnified view of the object 340 being targeted and/or magnified. That is, the scope mode view 380 of the magnified object is presented within a display of the HMD of the user. In particular, an object in the corresponding scene may be the target within the scope mode view 380, such as character 340. In one implementation, the scope mode view may automatically center the object as displayed in the HMD (e.g., centered on the virtual crosshair 385 of the scope). In another implementation, the scope mode view is controlled through user input (e.g., through one or more controllers).

The scope mode view 380 may be an indication that the attention of the user 302 is directed towards the object being magnified. That is, the object is of interest to the user, such as character 340 as the targeted object. In one implementation, a HUD interface 355 is populated in the scope mode view 380. For example, the HUD interface 355 may be provided as an overlay within the scope mode view 380, or may be embedded within the portion of the scene being magnified within the scope mode view 380, as previously described.

Further, information related to the object may be presented in the HUD interface 355, as previously described. A blow-up of the HUD interface 355 is shown in FIG. 3C, to illustrate information 356 contained in the HUD interface 355. As shown, the information 356 is related to the magnified object. For purposes of illustration only, the information 356 may include the name of character 340 (i.e., Doko) being magnified, that the character is an enemy combatant of the warrior class, is highly skilled at hand-to-hand combat, and requires 7 hits to make a kill. In that manner, the user 302 may be fully aware of the situation before engaging with the character 340 Doko.

Figure 4:
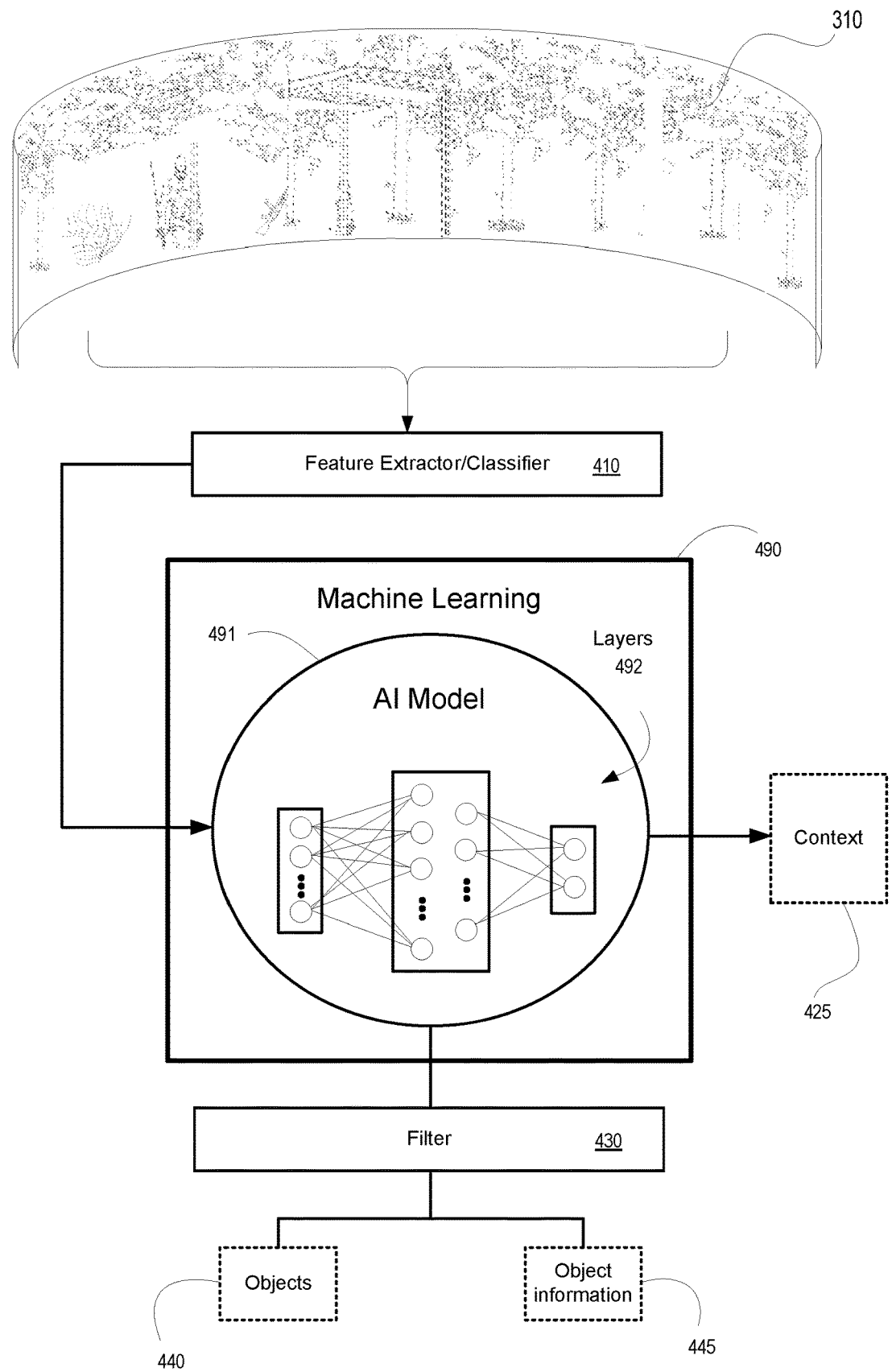
FIG. 4 illustrates the application of rules and/or artificial intelligence to determine context of a scene in virtual reality, the identification of an object within the scene, and the generation of information related to the object based on the context that can be viewable through a heads up display provided within the scene, in accordance with one embodiment of the present disclosure.

FIG. 4 illustrates the application of artificial intelligence (AI) to determine context of a scene in virtual reality, the identification of an object within the scene, and the generation of information related to the object based on the context that can be viewable through a heads up display provided within the scene, in accordance with one embodiment of the present disclosure.

In one embodiment, an object within a scene may be identified through rules configured to determine the most relevant objects within that scene. That is, the identification of an object within a scene, the determination of that object being important to the game play of the user, and generation of information related to the object, and the surfacing of the information within an HUD interface within an FOV of the user in an HMD is performed manually, such as through implementation of rules.

In another embodiment, AI may be implemented to identify an object within a scene, determine that object is important to the game play of the user, generate information related to the object, and surface the information within an HUD interface in the scene within an FOV of the user in an HMD. In particular, the object may be determined through application of AI that takes into consideration the context of the game play and the scene shown in the FOV to the user.

The AI model 491 is trained using training data provided as input into the machine learning engine 490, which implements a training algorithm to tweak parameters of the AI model 491, so that the trained AI model can classify and/or identify objects within a scene of a game play of the user, so that the AI model can classify and/or identify the importance of the objects within the scene of a game play of the user, and/or classify and/or identify information related to the objects that are classified and/or identified as being important. Various techniques may be used to train and/or build the AI model 491, such as using artificial intelligence, supervised and/or unsupervised learning algorithms, reinforcement learning, etc. The machine learning engine 490 performing AI may be implemented as a type of neural network, and represents a network of interconnected nodes including a hierarchy or layers 492 of nodes. Knowledge can be exchanged between the nodes, and activation of certain nodes within the layers 492 in response to an input gradually trains the AI model 491. Repeated training using multiple inputs generally increases the accuracy of the AI model 491 to classify objects within a scene, determine their importance, and identify information relevant to those objects.

As shown, scene 310 is provided as an input into a feature extractor and/or classifier 410, which is configured to extract features from the scene. For example, the features may be objects or portions of objects that are included within scene 310. Classification of those objects may be performed with application of manual rules, such that the features and/or objects corresponds to those features are classified. In that manner, the objects within the scene through classification are known.

In another embodiment, the extracted features are provided as input into the machine learning engine 490, and the AI model 491 is used to classify the objects within the scene 310. In that manner, a plurality of objects within a scene of the virtual environment is identified and/or classified using artificial intelligence (AI). For example, the AI model 491 (as implemented by the machine learning engine 490) is configured to identify and/or classify the objects within a scene. That is, the AI model 491 is a machine learning model configured to apply machine learning to classify the objects within the scene.

In still another embodiment, the AI model 491 is a machine learning model that is configured to determine a context of the scene within a game play of the user. That is, the extracted features and classified features are used by the AI model 491 to classify and/or determine a context of the scene within a game play of the user playing a video game. As such, the AI model 491 provides as output the context 425 of the scene.

In another embodiment, the AI model 491 is configured to determine that the identified object is important to the game play of the user based on the previously determined context. That is, the extracted features and/or classified features and game context are used by the AI model 491 applying machine learning to classify and/or determine the importance of the object within the game play of the user. For example, the AI model 491 can determine whether an object is important or not important, which is provided as an output from the AI model 491 (e.g., important objects 440).

When the object is classified as being important by the AI model, information related to the object based on the context may be generated. The information may be generated and/or identified or classified using the AI model 491, or may be generated and/or identified using rules. If using AI, the AI model 491 provides the information as an output (e.g., information 445).

In one embodiment, the number of objects within a scene being classified and brought to the attention of the user may overwhelm the user. As such, a filter 430 may be implemented to reduce the number of objects that are considered important in the game play of the user. For example, the filter 430 may apply an importance filter that identifies only the most important objects within the game play of the user, and that is based on the classified context of the scene and/or game play of the user. In one embodiment, the filter determines that the gaze of the user is directed towards the corresponding object for a first time in the game play of the user, and passes that object through the filter 430 for presentation to the user. Other identified objects that have been encountered by the user do not pass through the filter 430 (e.g., are filtered out). The objects 440 that have been classified, and filtered, are provided as an output from the AI model 491.

Further, the amount of information for a particular object that is classified and/or identified, and classified as being important, may overwhelm the user. As such, the filter 430 may be implemented to reduce the amount of information that ultimately is presented to the user through a HUD interface. For example, filter 430 may determine the most relevant and/or important information based on the classified context of the scene and/or game play of the user. The information 445 that have been classified, generated, and/or filtered, is provided as an output from the AI model 491.

In one embodiment, the information included within the HUD interface for presentation to a user is shared with other users and/or players. For example, a user may be part of a team including a plurality of players participating in a multi-player gaming session. Information that is presented to the user within the game play of the user, such as through an HUD interface, may be presented to other team members. The information may be presented to the other team members, even though they may not be viewing the same scene and/or objects instigating the propagation of the information within the HUD interface. For example, the user may encounter a sniper within a jungle, wherein information about the sniper is presented to the user through a HUD interface within a scene. Information about that sniper may be useful to other team members, even though those team members have not encountered the sniper in their game plays. In that manner, all team members are made aware of the sniper (e.g., location, capabilities, etc.), and may adjust their game plays accordingly.

In another embodiment, team members participating in a multi-player gaming session may utilize a team chat platform for communication during their game plays. That is, a communication session is established between a user and other players on the team. The chat session may be monitored (e.g., monitoring audio and/or text of the session). More particularly, automatic speech recognition (ASR) algorithms are applied to the audio, in order to understand the communication. A context of the chat can be identified based on the speech recognition. Information related to the chat can be generated based on a context of the game play by the team members. For example, information deemed important and revealed during the chat session may be generated. That information is then presented to one or more team members in corresponding HUD interfaces. In that manner, important information revealed during a chat between two or more members of a team is disseminated to all players on the team.

Accordingly, the present disclosure describes methods and systems for providing information of an object in a heads up display (HUD) within a virtual environment as viewed through a head mounted display (HMD). In that manner, the user is provided with information relevant to a game play of a user, for example, and may enhance the user experience when playing the video game.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium, such as program modules, executed by one or more computers or other devices. The computer readable medium is any data storage device that can store data, which can be thereafter be read by a computer system. By way of example, and not limitation, computer-readable storage media may comprise non-transitory computer storage media and communication media. Examples of the computer readable medium include, but are not limited to, hard drives, network attached storage (NAS), read-only memory, random-access memory, electrically erasable programmable ROM (EEPROM), flash memory or other memory technology, compact disk ROM (CD-ROM), CD-Rs, CD-RWs, magnetic tapes and other optical and non-optical data storage devices, or any other medium that can be used to store information that is accessible. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method, comprising;
rendering a view of a virtual environment of a video game for display in a head mounted display of a user, wherein the virtual environment includes a plurality of objects;
tracking gaze of the user;
detecting that the gaze of the user is directed towards an object in the view for a period of time;
generating a heads up display (HUD) interface including information related to the object;
surfacing the HUD interface near the object in the view of the virtual environment;
detecting that the gaze is directed away from the object;
generating a gaze history function of the gaze that is tracked after detecting the gaze is directed away from the object, wherein the gaze history function measures attention of the user in relation to the object;
removing the HUD interface when the gaze history function satisfies a time decay function that measures decaying attention of a generic user in relation to a generic object; and
increasing transparency of the HUD interface before performing the removing of the HUD interface as long as the gaze history function satisfies the time decay function.

2. The method of claim 1, further comprising:
providing the HUD interface as an overlay.

3. The method of claim 1, further comprising:
embedding the HUD interface within the virtual environment.

4. The method of claim 1,
wherein the HUD interface is transparent having a degree of transparency such that the virtual environment is visible through the HUD interface based on the degree of transparency.

5. The method of claim 1, further comprising:
identifying a plurality of objects within a scene of the virtual environment using artificial intelligence (AI), wherein the plurality of objects includes the object such that the object is identified;
determining context of the scene within a game play of the user using the AI;
determining that the object is important to the game play of the user based on the context; and
generating the information related to the object based on the context.

6. The method of claim 5, further comprising:
highlighting the object within the view of the virtual environment after the object is identified and after the object is determined to be important to the game play of the user,
wherein the HUD interface is surfaced after the gaze of the user is detected to be directed towards the object that is highlighted for the period of time.

7. The method of claim 1, further comprising:
zooming in towards the HUD interface, such that the HUD interface gradually becomes larger within a field of view of the user while the gaze of the user is directed towards the object;
detecting that the gaze of the user is directed away from the object; and
zooming out away from the HUD interface, such that the HUD interface gradually becomes smaller within the field of view of the user.

8. The method of claim 7, further comprising:
wherein the field of view of the user is a sniper mode view of the virtual environment.

9. The method of claim 1, further comprising:
sharing the information included within the HUD interface with a player,
wherein the user and the player are members of a team participating in a multi-player gaming session.

10. The method of claim 1, further comprising:
establishing a communication session between the user and a player, wherein the user and the player are members of a team participating in a multi-player gaming session;

monitoring audio of the communication session;
performing speech recognition on the audio;
identifying a context of the audio based on the speech recognition;
generating second information related to the context; and
presenting the second information in the HUD interface.

11. The method of claim 1, further comprising:
determining that the gaze of the user is directed towards the object for a first time in a game play of the user.

12. A computer system, comprising:
a processor;
memory coupled to the processor and having stored therein instructions that, if executed by the computer system, cause the computer system to execute a method, comprising:
rendering a view of a virtual environment of a video game for display in a head mounted display of a user, wherein the virtual environment includes a plurality of objects;
tracking gaze of the user;
detecting that the gaze of the user is directed towards an object in the view for a period of time;
generating a heads up display (HUD) interface including information related to the object;
surfacing the HUD interface near the object in the view of the virtual environment;
detecting that the gaze is directed away from the object;
generating a gaze history function of the gaze that is tracked after detecting the gaze is directed away from the object, wherein the gaze history function measures attention of the user in relation to the object;
removing the HUD interface when the gaze history function satisfies a time decay function that measures decaying attention of a generic user in relation to a generic object; and
increasing transparency of the HUD interface before performing the removing of the HUD interface as long as the gaze history function satisfies the time decay function.

13. The computer system of claim 12, the method further comprising:
identifying a plurality of objects within a scene of the virtual environment using artificial intelligence (AI), wherein the plurality of objects includes the object such that the object is identified;
determining context of the scene within a game play of the user using the AI;
determining that the object is important to the game play of the user based on the context; and
generating the information related to the object based on the context.

14. A method, comprising;
rendering a view of a virtual environment of a video game for display in a head mounted display of a user, wherein the virtual environment includes a plurality of objects;
tracking gaze of the user;
detecting that the gaze of the user is directed towards an object in the view for a period of time;
generating a heads up display (HUD) interface including information related to the object;
surfacing the HUD interface near the object in the view of the virtual environment;
identifying the plurality of objects within a scene of the virtual environment using artificial intelligence (AI), wherein the plurality of objects includes the object such that the object is identified;
determining context of the scene within a game play of the user using the AI;
determining that the object is important to the game play of the user based on the context;
generating the information related to the object based on the context; and
highlighting the object within the view of the virtual environment after the object is identified and after the object is determined to be important to the game play of the user,
wherein the HUD interface is surfaced after the gaze of the user is detected to be directed towards the object that is highlighted for the period of time.

15. The method of claim 14, further comprising:
providing the HUD interface as an overlay.

16. The method of claim 14, further comprising:
embedding the HUD interface within the virtual environment.

17. The method of claim 14,
wherein the HUD interface is transparent having a degree of transparency such that the virtual environment is visible through the HUD interface based on the degree of transparency.

18. The method of claim 14, further comprising:
detecting that the gaze is directed away from the object;
generating a gaze history function of the gaze that is tracked after detecting the gaze is directed away from the object, wherein the gaze history function measures attention of the user in relation to the object; and
removing the HUD interface when the gaze history function satisfies a time decay function that measures decaying attention of a generic user in relation to a generic object.

19. The method of claim 18, further comprising:
increasing transparency of the HUD interface before performing the removing of the HUD interface as long as the gaze history function satisfies the time decay function.

20. The method of claim 14, further comprising:
zooming in towards the HUD interface, such that the HUD interface gradually becomes larger within a field of view of the user while the gaze of the user is directed towards the object;
detecting that the gaze of the user is directed away from the object; and
zooming out away from the HUD interface, such that the HUD interface gradually becomes smaller within the field of view of the user.

21. A method, comprising;
rendering a view of a virtual environment of a video game for display in a head mounted display of a user, wherein the virtual environment includes a plurality of objects;
tracking gaze of the user;
detecting that the gaze of the user is directed towards an object in the view for a period of time;
generating a heads up display (HUD) interface including information related to the object;
surfacing the HUD interface near the object in the view of the virtual environment;
zooming in towards the HUD interface, such that the HUD interface gradually becomes larger within a field of view of the user while the gaze of the user is directed towards the object;
detecting that the gaze of the user is directed away from the object; and zooming out away from the HUD interface, such that the HUD interface gradually becomes smaller within the field of view of the user.

22. A method, comprising;

rendering a view of a virtual environment of a video game for display in a head mounted display of a user, wherein the virtual environment includes a plurality of objects;

tracking gaze of the user;

detecting that the gaze of the user is directed towards an object in the view for a period of time;

generating a heads up display (HUD) interface including information related to the object;

surfacing the HUD interface near the object in the view of the virtual environment;

establishing a communication session between the user and a player, wherein the user and the player are members of a team participating in a multi-player gaming session;

monitoring audio of the communication session;

performing speech recognition on the audio;

identifying a context of the audio based on the speech recognition;

generating second information related to the context; and presenting the second information in the HUD interface.

* * * * *